P. DIETZ.
CAMERA.
APPLICATION FILED OCT. 19, 1912.
1,091,814.
Patented Mar. 31, 1914.
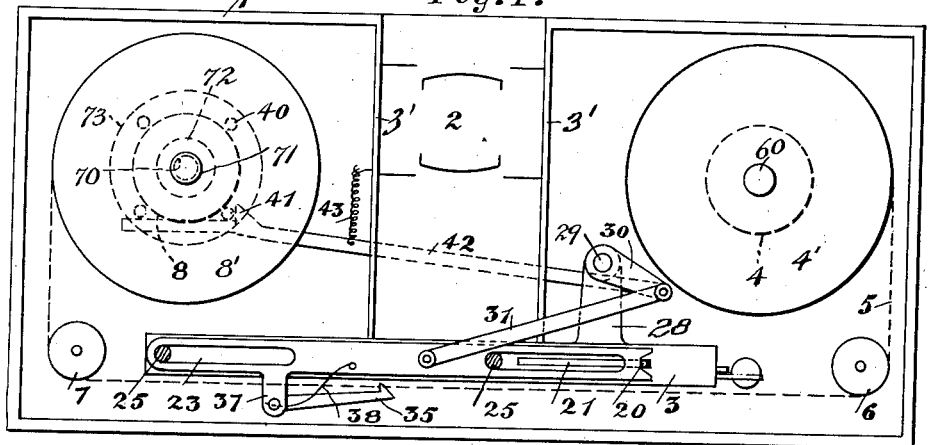
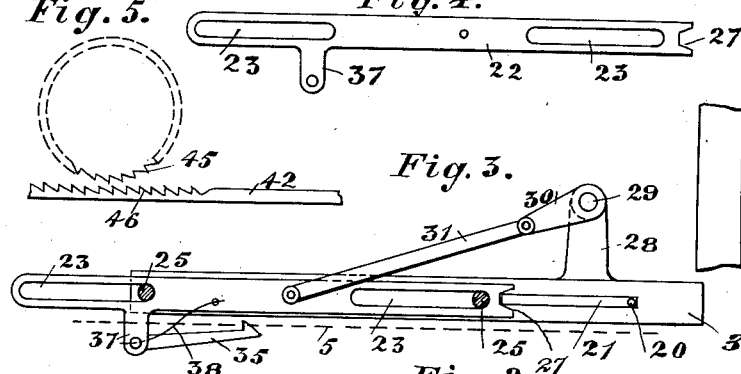
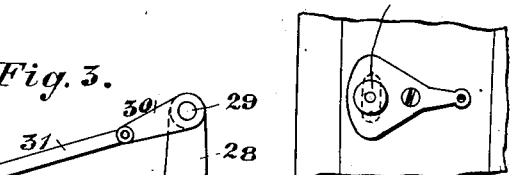
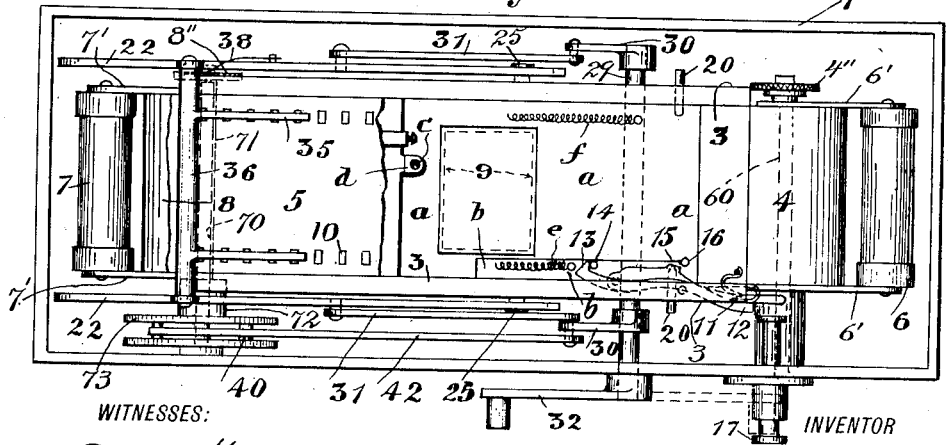
WITNESSES:
INVENTOR
Paul Dietz.
BY
ATTORNEY

UNITED STATES PATENT OFFICE.

PAUL DIETZ, OF BROOKLYN, NEW YORK, ASSIGNOR TO NEW IDEAS MANUFACTURING COMPANY, OF NEW YORK, N. Y., A CORPORATION OF NEW YORK.

CAMERA.

1,091,814. Specification of Letters Patent. Patented Mar. 31, 1914.

Application filed October 19, 1912. Serial No. 726,643.

*To all whom it may concern:*

Be it known that I, PAUL DIETZ, a subject of the Emperor of Germany, residing at Brooklyn, in the county of Kings and State of New York, have invented certain new and useful Improvements in Cameras, of which the following is a specification.

This invention relates to cameras, the object of the invention being to provide improved means for setting and holding the shutter against improper operation and in which also the shutter cannot be operated after the exposure of the film to reëxpose a previously exposed portion of a film, in which the exposed film is automatically wound up as the new film is brought into position to be exposed, in which the feeding of the film is uniform so that an excess of feeding or lack of feeding cannot occur, and in which an exposure of only one film can be made at a time.

In the drawings accompanying and forming part of this specification, Figure 1 is a side view of the present improvement applied to that form of camera known as a film camera, with the casing open to expose the interior mechanism; Fig. 2 is a rear view of the camera, the casing of the camera being open to show the internal mechanism, and the rear plate of the shutter casing 3 being broken away between the points where it is attached to the upper and lower guide rolls 6 and 7, the film also being broken away more clearly to illustrate the shutter mechanism; Fig. 3 is a side view of the shutter casing; Fig. 4 is a side view of a part of the means for raising and holding the shutter in its proper position to be operated; Fig. 5 is a detail view of a modified form of means for operating one of the film rolls; and Fig. 6 is a detail view of the push button 17, illustrating in dotted lines the slot whereby said push button can be moved into position to engage the end of the lever 11 or moved into position to engage both the levers 11 and 12.

Similar characters of reference indicate corresponding parts throughout the different figures of the drawings.

In the present improvement the shutter is shown arranged in the rear of the lens, but this is of no importance, as the shutter may be variously arranged in front of the plate or film, such re-location simply requiring the proportions of the levers to be changed. In the present improvement a perforated film is used.

The present improvement, in the preferred form thereof, will of course include a casing 1 for supporting the several mechanisms and a suitable lens 2, a shutter carrying casing 3, which is suitably supported by the casing 1, in the present instance by the walls $3^1$ which support the lens 2, and suitable film carrying and guiding means, which in the present instance comprises a film carrying roll 4 shown herein as located at one end of the camera, the film 5 of which, which may be of any desired length to contain six, twelve, thirty or more pictures as may be preferred, is guided over a guide roll 6 at one end of the shutter carrying casing 3 to a similar guide roll 7 at the other end of the casing and then to a take-up roll 8, to which one end of the film is attached in any of the usual ways, the film being drawn behind the shutter casing passing an exposed opening 9. The guide rolls 6 and 7 are carried by arms 6' and 7' respectively, the inner ends of which are attached to the rear plate of the shutter casing. In the present instance the film is shown provided with perforations 10, by means of which it may be fed.

Any suitable form of shutter mechanism may be used which is well known in the art, and therefore only a brief description thereof is necessary so far as the general construction of this shutter mechanism is concerned.

In the present instance the casing 3 carries the two part shutter, which may consist of two sliding members or plates *a* and *b* spring actuated in the usual manner. These members or plates may be held in their operative position for release by a pair of levers 11 and 12, the lever 11 having a hook 13 for engaging a pin 14 carried by one of the members or plates, as *b*, and the lever 12 having a projection or shoulder 15 for engaging the pin 16 of the other member or plate, as *a*, the levers being operated by a suitable plunger or push button 17, which is adjustably supported by pivoting a depending plate thereof on the outside of one side wall of the casing 1 with a part of the button extending through a slot in such casing wall, so as to engage one or both of the levers as occasion may require, this being one of the usual ways of operating shutters of this character and therefore but a brief description is deemed necessary. As hereinbefore stated, the shutter casing 3 is supported by the side walls 3¹ forming the casing for the lens 2, and these side walls 3¹ form a part of the main casing or camera box. The shutter casing simply comprises two sides, as shown at 3, and a front and rear plate attached thereto, and between which plates the thin shutter members or plates $a$ and $b$ are supported for sliding movement. The shutter member $a$ is located in the rear of the member $b$, considering the top of the sheet of drawings as the front of the camera when the sheet is turned on its side, and carries, as hereinbefore stated, a pin 16 for engagement with the hook 15 of the lever 12. The other shutter member $b$, which, as hereinbefore stated, has the pin 14 for engagement with the hook 13 of the lever 11, is provided with the pins 20 hereinafter referred to. At the lower ends of the shutter members the member $b$, which carries the pins 20 hereinafter referred to, has a projection $c$ which engages the edge of a little recess $d$ of member $a$, so that when the shutter member $b$ is raised in the manner hereinafter described, through the medium of the pins 20 thereof, it will also raise the shutter member $a$; in other words, they will both be raised together against the tension of the springs $e$ and $f$, $e$ being secured at one end to the shutter member $b$ and $f$ at one end to the shutter member $a$, while the opposite ends are secured to the casing and serve to pull the shutter members downwardly when released. The lever 12, with its hook 13, holds both shutter members in their raised position when in engagement with the pin 14, so that when this hook is released by the push pin 17 both shutter members will move downwardly rapidly, but one slightly in advance of the other in the usual way to give an instantaneous exposure. When, however, it is desired to give a time exposure, it is merely necessary to swing the push button 17 into position so that it will engage both the upper ends of the levers 12 and 11, in consequence of which, when the push button 17 is moved inwardly it engages the lever 11 and releases the hooked end thereof from the pin 14, whereupon the shutter member $b$ is, by reason of its spring, pulled downward, but owing to the form of the hook portion 15 of the lever 12 and to the fact that this lever 12 extends at its upper end somewhat beyond the lever 11, this same inward movement of the push button first pushes the hooked end 15 under the pin 16, so that the shutter member $a$ is held up although its companion member $b$ has been pulled down, during all of which time, of course, the film is being exposed to the light through the lens. When the push button is released it of course releases the lever 12 and the hook thereof is withdrawn from the pin 16 and the shutter member $a$ then follows to close the usual exposure opening. It will of course be understood that these levers 11 and 12 are controlled by springs usually located at the top thereof. In this form of shutter mechanism, however, when after an exposure the sliding shutters have been shifted into their raised position in readiness to be released in the manner hereinbefore described there is nothing to prevent the operation of the button 17 and thus operate the shutters improperly to reëxpose the previously exposed film before a new film has been properly positioned, and one of the features of the present improvement is the provision of means which will prevent the improper operation of the shutter member $b$. For this purpose the shutter is provided with projections or pins 20, although one will be sufficient if preferred, one at each side thereof, projecting through elongated slots 21 in the sides of the shutter casing 3, these pins coöperating with the means for raising the shutters into their proper position to be released by the push button 17 hereinbefore described.

Preferably located on each side of the shutter casing is a slotted shutter operating bar 22, see Fig. 4, into the slots 23 of which headed studs or screws 25 project for guiding these bars. These studs are carried by the sides of the casing 3. Each of these slotted bars is provided with a notch or bifurcation 27 at its upper end for engaging the pins 20 of the shutter member $b$ and thereby raise both shutter members into their highest position. For shifting these slotted side bars the shutter casing is provided with projections 28 carrying a rock shaft 29 having crank arms 30 linked to the slotted side bars by links 31, and this rock shaft projects through the casing 1 and is provided with a crank 32 for rocking it, whereby the slotted side bars will be raised and lowered by the handle. It will thus be observed that as the slotted side bars are raised when the shutter is in its lowest position, having been drawn into that position by the springs provided for that purpose in the usual manner, the shutter member $b$ and thereby the member $a$ will be raised by means of the projections 20 into position to bring the pins 14 and 16 into position to be engaged by the hooks of the shutter releasing levers hereinbefore referred to and it will also be obvious that so long as the handle remains in the dotted line position shown in Fig. 2 the slotted side bars will engage the pins 20 of the shutter and hold the same against being released by its push button 17 or other operating means, so that until this handle 32 has been started downward to carry the slotted side bars downward and away from the pins 20 it is not possible to operate the shutter.

Carried by the slotted side bars is a film operating device, which in the present instance comprises a pair of hooked arms 35 carried by a swinging shaft or member 36 supported on ears 37 of the slotted side bars 22 and being yieldingly held against the film by means of a spring 38. Thus as the slotted side bars are raised these hooked film actuating members 35 are raised into position to engage perforations of the film, and as the handle is lowered to lower the side bars these hooked members will be carried downward and so draw downward a portion of the film from the roller 4. The film as it is drawn downward in the manner set forth is automatically wound upon the roller 8. This take-up roller 8 as well as the film-carrying roller 4 have flanges 8' and 4' respectively, one at each end, for guiding the film; (see Fig. 1). These flanges, however, are not illustrated in Fig. 2 because they are located back of the shutter carrying casing and only the thin edges thereof could be shown by dotted lines, and therefore they, together with such parts of the film rolls 4 and 8 would have to be shown in dotted lines, have been omitted to simplify the illustration. The flanges of disks 4' and 8' are clamped in position by means of knurled nuts 4" and 8" respectively, and these flanges 4' and 8', together with the rollers 4 and 8, are mounted upon fixed shafts 60 and 70 carried by one of the walls of the camera box and are rotatable on these shafts, which have threaded outer ends for the reception of the knurled nuts 4" and 8". The take-up roll 8, however, is carried by a sleeve 71, it being tight thereon or keyed thereto, and this sleeve 71, (see Fig. 1), is rotatable upon the shaft 70 and at the inner end has one of the flanges 8' secured thereto or made as a part thereof, the other flange, or that one adjacent to the knurled nut 8", of course being removable to permit the film roll 8 to be removed from its sleeve 71. Between this fixed flange and the means about to be described for rotating this take-up roll some suitable frictional engaging means is located. In practice a flat spring may be, and is, used, it being carried by a wheel 73, but in the present instance a space block 72 is shown, and by means of the knurled nut 8" this space block is maintained in tight frictional engagement with one of the disks 8', it being carried by the wheel 73, whereby on the rotation of this wheel 73 the take-up roll will be rotated, but such take-up roll permitted to slip as the roll of film gradually increases in diameter. For rotating this take-up roll the wheel 73 is provided with a series of pins 40 adapted to be engaged by a tooth 41 carried by an operating-bar 42 pivotally secured at one end to the crank arm 30 of the rock shaft, so that each time the handle 32 is moved downward when the camera is held with that end carrying the film-carrying roll 4 upright or at the top of the camera in the manner hereinbefore described this bar, which is held in engagement with the pins of the wheel 73 by means of a spring 43, will engage one of the pins 40 of such wheel and rotate it the required distance in a manner which will be readily understood, and this will, by means of the frictional engagement hereinbefore referred to, rotate the take-up roll, which frictional engagement will permit the roll to slip when necessary. Thus, as the handle is raised the shutter members are lifted into position to have their pins 14 and 16 engaged by the hooked levers and in this position should the push button 17 be operated no exposure will take place. As the handle is pulled downward into its full line or normal position shown in Fig. 2 the previously exposed film is carried downward and wound automatically upon the take-up roll and the forked side bars carried away from the pins 20 of the shutter member b, so as to release the same and enable them to be operated in the usual manner by the button 17.

From the foregoing it will be observed that so long as the handle is in one position, as for instance its raised position, the premature exposure of a film is impossible. As the purpose of grasping the handle when it is in its raised position is to return it, that is to draw it to another position, as for instance downward to its full extent, it follows that it would be fully lowered when once it was grasped for the purpose of lowering it, so that there would be but little opportunity to open the shutter during the lowering operation of the handle. If, however, such action should take place it will be obvious from the foregoing that as the handle is lowered the previously exposed film is shifted, and as the shutter cannot be fully opened until the handle is completely lowered, the amount of such opening of the shutter corresponding with the movement of the handle, it follows that should the shutter be accidentally tripped during the lowering of the handle it would only expose a new portion of the film and would not expose a previously exposed portion of a film. So that, as stated herein, while the handle is in its raised position the shutter cannot be opened at all, and therefore the exposure of a previously exposed film is not possible.

It will be understood that instead of providing the particular means shown for rotating the take-up drum or roll the take-up roll actuating wheel could be provided with teeth 45 instead of pins 40 and the bar 42 could be provided with a rack 46 instead of teeth 41 for rotating it, as shown in Fig. 5.

I claim as my invention:

1. In a film camera, the combination with a sliding shutter and means for holding and releasing it, of means for engaging and locking said shutter against release thereby to prevent reëxposure of a previously exposed film, and means for shifting the film simultaneously with the release of said shutter locking means.

2. In a film camera, the combination with a sliding shutter and means for holding and releasing it, of means for locking said shutter against release thereby to prevent reexposure of a previously exposed film, and comprising a pin carried by the shutter and sliding means for engaging said pin, and means for shifting the film simultaneously with the release of said shutter locking means.

3. In a film camera, the combination with a shiftable shutter and means for holding and releasing it, of means for locking said shutter against release thereby to prevent reëxposure of a previously exposed film, and comprising a pin carried by the shutter and sliding means for engaging said pin, and means for shifting the film simultaneously with the release of said shutter locking means.

4. In a film camera, the combination with a shiftable shutter and means for holding and releasing it, of shiftable means for setting said shutter and effective to engage a part of and hold such shutter against release thereby to prevent reëxposure of a previously exposed film, and means for shifting the film simultaneously with the release of said shutter engaging means.

5. In a film camera, the combination with a shiftable shutter and means for holding and releasing it, of shiftable means for engaging said shutter and effective to engage a part of and hold said shutter against release thereby to prevent reëxposure of a previously exposed film, and comprising a sliding member adapted to engage a part of said shutter and a handle for reciprocating said sliding member, and means for shifting the film simultaneously with the release of said sliding member.

6. In a film camera, the combination with a shiftable shutter and means for holding and releasing it, of shiftable means for setting said shutter and means for actuating said shiftable means, said shiftable means being effective to engage a part of and thereby to set and lock said shutter on the movement of said actuating means in one direction and maintain it against release thereby to prevent reëxposure of a previously exposed film until the movement of said actuating means in the opposite direction, and means for shifting the film simultaneously with the release of said shiftable means.

7. In a camera, the combination with a shiftable shutter having a pin and means for holding and releasing said shutter, of shiftable means for setting said shutter and comprising a sliding member adapted to engage said pin, a swinging handle for actuating said sliding member, said sliding member being effective to set and lock said shutter upon movement of the handle in one direction and to maintain it against release until movement of the handle in the opposite direction.

8. In a camera having a shiftable film the combination with a shiftable shutter, and means for holding and releasing it, of shiftable means for setting said shutter, means for actuating said shiftable means, said shiftable means being effective to set and lock said shutter on the movement of said actuating means in one direction and maintain it against release until the movement of said actuating means in the opposite direction, and means for operating the film simultaneously with the shifting of said shiftable means in one direction.

9. In a camera having a shiftable film the combination with a shiftable shutter, and means for holding and releasing it, of shiftable means for setting said shutter, means for actuating said shiftable means, said shiftable means being effective to set and lock said shutter on the movement of said actuating means in one direction and maintain it against premature release until the movement of said actuating means in the opposite direction, means for operating the film simultaneously with the shifting of said shiftable means in one direction, and means for automatically taking up the film and operative on the shifting of said shiftable means in one direction.

10. In a camera having a shiftable film the combination with a shiftable shutter, and means for holding and releasing it, of shiftable means for setting said shutter, a swinging handle for actuating said shiftable means, said shiftable means being effective to set and lock said shutter on the movement of the handle in one direction and maintain it against release until the movement of the handle in the opposite direction, means for operating the film on the return movement of said handle, and means for automatically taking up the film on said return movement of the handle.

11. In a camera having a shiftable film the combination with a shiftable shutter, and means for holding and releasing it, of sliding means for setting said shutter, means movable in one direction for actuating said sliding means thereby to set and lock the shutter against release and movable in the opposite direction for unlocking said shutter thereby to permit its release, and means operative on the return of said movable means for shifting the film and for automatically winding it.

12. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, and connecting means between said rock shaft and sliding bar whereby until the return of the handle toward its normal position the shutter is maintained locked.

13. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, film carrying means, and means carried by said sliding bar for shifting the film.

14. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, film carrying means, and means carried by said sliding bar for shifting the film on the return of said handle to its normal position.

15. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, film carrying means, and means carried by said sliding bar for shifting the film on the return of said handle to its normal position and comprising a toothed member yieldingly held against the film for engaging perforations thereof.

16. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, and means for automatically shifting a film on the return of the handle to its normal position.

17. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, and means for automatically shifting a film on the return of the handle to its normal position and comprising a take-up roll and a toothed bar for operating it, said bar having connection with said rock shaft.

18. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, film carrying means, means carried by said sliding bar for shifting the film, and automatically operative take-up means operated on the return of the handle to its normal position.

19. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, film carrying means, means carried by said sliding bar for shifting the film, and automatically operative take-up means operated on the return of the handle to its normal position and connected with said rock shaft.

20. In a camera, the combination with a shutter carrier having a shiftable shutter and means for holding and releasing it, of means for setting and locking said shutter against release and comprising a pin carried by said shutter, a sliding bar carried by said carrier and effective to engage said pin to set and lock the shutter, a rock shaft, a handle for operating said rock shaft, connecting means between said rock shaft and sliding bar whereby until the return of the handle toward its normal position the shutter is maintained locked, means carried by the sliding bar for shifting a film during the return of the handle to its normal position, a take-up roll for automatically taking up the film, and means connected with said rock shaft for operating said roll on the return of said handle to its normal position.

21. In a camera, the combination with a shiftable film, a shutter carrier having a shiftable shutter, and means for holding and releasing said shutter, of means for setting and locking said shutter thereby to prevent release thereof and comprising a projection carried by said shutter, a sliding bar carried by said carrier and adapted to engage said projection to set and lock the shutter, a rock shaft, a swinging handle carried by said rock shaft, linkage connection between said rock shaft and sliding bar, means carried by the sliding bar for shifting the film on the return of the swinging handle to its normal position, a take-up roll for the film, and means connected with the rock shaft for operating said roll on the return of the handle to its normal position.

Signed at 1821 Park Row Building, New York, N. Y., this 18th day of October, 1912.

PAUL DIETZ.

Witnesses:
C. A. WEED,
F. E. BOYCE.